US011953795B2

(12) United States Patent
Dong et al.

(10) Patent No.: US 11,953,795 B2
(45) Date of Patent: Apr. 9, 2024

(54) PIXEL UNIT OF A DISPLAY PANEL AND DISPLAY PANEL

(71) Applicant: TCL CHINA STAR OPTOELECTRONICS TECHNOLOGY CO., LTD., Guangdong (CN)

(72) Inventors: Chengcai Dong, Guangdong (CN); Ding Li, Guangdong (CN); Yi Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 214 days.

(21) Appl. No.: 17/614,502

(22) PCT Filed: Oct. 28, 2021

(86) PCT No.: PCT/CN2021/126908
§ 371 (c)(1),
(2) Date: Nov. 26, 2021

(87) PCT Pub. No.: WO2023/050515
PCT Pub. Date: Apr. 6, 2023

(65) Prior Publication Data
US 2023/0098050 A1  Mar. 30, 2023

(30) Foreign Application Priority Data
Sep. 29, 2021  (CN) .......................... 202111152298.4

(51) Int. Cl.
*G02F 1/1362* (2006.01)
(52) U.S. Cl.
CPC .. *G02F 1/136286* (2013.01); *G02F 1/136209* (2013.01)

(58) Field of Classification Search
CPC .................................................. G02F 1/13628
(Continued)

(56) References Cited

U.S. PATENT DOCUMENTS

| 9,933,678 B1 | 4/2018 | Chen et al. |
| 2003/0137622 A1 | 7/2003 | Song |
| 2005/0225691 A1 | 10/2005 | Yi et al. |
| 2010/0118236 A1 | 5/2010 | Kim et al. |
| 2011/0063535 A1 | 3/2011 | Chang et al. |
| 2011/0128280 A1 | 6/2011 | Tseng et al. |

(Continued)

FOREIGN PATENT DOCUMENTS

| CN | 1677206 A | 10/2005 |
| CN | 101598877 A | 12/2009 |

(Continued)

OTHER PUBLICATIONS

Chinese Office Action issued in corresponding Chinese Patent Application No. 202111152298.4 dated Apr. 29, 2022, pp. 1-11.
(Continued)

*Primary Examiner* — Charles S Chang
(74) *Attorney, Agent, or Firm* — PV IP PC; Wei Te Chung; Zhigang Ma

(57) ABSTRACT

An embodiment of the present application discloses a pixel unit of a display panel and a display panel, wherein data lines are covered with a light shielding matrix element, two light shielding strips of the light shielding matrix element shield the two data lines respectively. Each light shielding strip comprises a first light shielding section and a second light shielding section in different widths overlap side edges of the main pixel electrode portion and side edges of the sub-pixel electrode portion respectively to effectively shield light leakage regions between the data lines and the pixel electrode, which solves the technical issue of the conventional pixel unit of a display panel forming light leakage regions between data lines and the pixel electrode, causing light leakage in a dark state, and resulting lowered display quality of the display panel and improves display quality.

9 Claims, 4 Drawing Sheets

(58) Field of Classification Search
USPC .................................................. 349/110–111
See application file for complete search history.

(56) References Cited

U.S. PATENT DOCUMENTS

| | | | |
|---|---|---|---|
| 2011/0149224 A1 | 6/2011 | Tseng et al. | |
| 2012/0169985 A1 | 7/2012 | Kim et al. | |
| 2016/0202582 A1 | 7/2016 | Paek et al. | |
| 2016/0291363 A1* | 10/2016 | Lee .................. | G02F 1/1339 |
| 2016/0342048 A1 | 11/2016 | Huang | |
| 2016/0342058 A1 | 11/2016 | Park et al. | |
| 2021/0255512 A1 | 8/2021 | Yukihiro | |

FOREIGN PATENT DOCUMENTS

| | | |
|---|---|---|
| CN | 102110685 A | 6/2011 |
| CN | 102156370 A | 8/2011 |
| CN | 102929058 A | 2/2013 |
| CN | 103852941 A | 6/2014 |
| CN | 104267534 A | 1/2015 |
| CN | 105068301 A | 11/2015 |
| CN | 106773392 A | 5/2017 |
| CN | 108646481 A | 10/2018 |
| CN | 109407388 A | 3/2019 |
| CN | 110824795 A | 2/2020 |
| IN | 205247020 U | 5/2016 |

OTHER PUBLICATIONS

International Search Report in International application No. PCT/CN2021/126908, dated Mar. 28, 2022.
Written Opinion of the International Searching Authority in International application No. PCT/CN2021/126908, dated Mar. 28, 2022.

* cited by examiner

PIXEL UNIT OF A DISPLAY PANEL AND DISPLAY PANEL

FIELD OF INVENTION

The present application relates to a field of displays, especially to a pixel unit of a display panel and a display panel.

BACKGROUND OF INVENTION

With reference to FIG. 1, FIG. 1 is a schematic plan view of a conventional pixel unit of a display panel. The pixel unit comprises intersecting data lines DL' and scan lines (gate electrode lines) SL', and a pixel electrode element P' at an intersection location between the data lines DL' and the scan lines SL'. The pixel electrode element P' comprises a main pixel electrode portion M' and a sub-pixel electrode portion S'.

The above pixel unit comprises characteristics of large aperture rate and high transmission, places the transparent main pixel electrode portion M' and sub-pixel electrode portion S' made of indium tin oxide (ITO) on a side of the scan line SL', and employs connection lines 90 extending outward from the sub-pixel electrode portion S' as a shielding element between the main pixel electrode portion M' and the data lines DL'. The shielding element has two functions, one function is shielding the data lines DL' from interfering with liquid crystals when the display panel presents a low grayscale, namely, prevents rotation of the liquid crystals above the data lines DL的 from interference. The other function is serving as a shielding layer between the main pixel electrode portion M' and the data lines DL' to reduce the parasitic capacitor between the main pixel electrode portion M' and the data lines DL'.

However, to enlarge the aperture rate, the connection lines 90 of the above pixel unit is not positively designed as a structure preventing light leakage in a dark state. According to the conventional light leakage issue, polarization light polarized from a lower substrate polarizer, when passing through side edges of the data lines DL', would vary and its polarization state changes to no longer have the polarization state determined by the lower substrate polarizer. The light with the changed polarization state would extend through an upper polarizer and causes light leakage region LK1 between the sub-pixel electrode portion S' and the data lines DL'. Therefore, light leakage region on the sub-pixel electrode portion S' in FIG. 1 requires shielding. For the main pixel electrode portion M', a gap of the connection line 90 of the sub-pixel electrode portion S' and the main pixel electrode portion M' is a light leakage region LK2, and liquid crystal molecules in the region under a dark state would rotate due to voltage difference between the main pixel electrode portion M' and the sub-pixel electrode portion S' voltage to cause light leakage in the dark state, which results in lowered quality of the display panel.

SUMMARY OF INVENTION

Technical Issue

The embodiment of the present application provides a pixel unit of a display panel and a display panel to solve a technical issue of a conventional pixel unit of a display panel forming light leakage regions between data lines and pixel electrode to cause light leakage in a dark state and result in lowered display quality of the display panel.

Technical Solution

In an aspect, the embodiment of the present application provides a pixel unit of a display panel disposed to correspond to an aperture region formed by two scan lines perpendicularly intersecting two data lines, and the pixel unit comprising:

a light shielding matrix element disposed above the two data lines and comprising two light shielding strips parallel to the two data lines; and a pixel electrode comprising:

a main pixel electrode portion, wherein the main pixel electrode portion comprises two side edges near the two data lines respectively; and a sub-pixel electrode portion comprises two side edges near the two data lines respectively and two connection lines extending from the two side edges respectively;

wherein each of the light shielding strips shields a corresponding one of the data lines and a corresponding one of the connection lines, and the light shielding strips overlap the two side edges of the main pixel electrode portion respectively and overlap the two side edges of the sub-pixel electrode portion respectively.

In some embodiments of the present application, the two connection lines of the sub-pixel electrode portion extending toward the main pixel electrode portion, and each of the connection line at least partially overlap a corresponding one of the data lines;

a gap is formed between each of the side edges of the main pixel electrode portion and a corresponding one of the connection lines; and each of the light shielding strips comprises:

a first light shielding section shielding a section of one of the data lines near the main pixel electrode portion and one of the connection lines, and overlapping one of the side edges of the main pixel electrode portion; and a second light shielding section connected to the first light shielding section, shielding a section of one of the data lines near the sub-pixel electrode portion, and overlapping one of the side edges of the sub-pixel electrode portion.

In some embodiments of the present application, a size of the main pixel electrode portion along a direction of the scan lines is less than a size of the sub-pixel electrode portion along the direction of the scan lines;

a width of the first light shielding section along the direction of the scan lines is greater than a width of the second light shielding section along the direction of the scan lines.

In some embodiments of the present application, the width of the second light shielding section along the direction of the scan lines is greater than a width of the data line; and the width of the first light shielding section along the direction of the scan lines is greater than a sum of a width of the connection line along the direction of the scan lines and the gap.

In some embodiments of the present application, a projection of the gap on a plane where the data lines are located is within a projection of the first light shielding section on the plane where the data lines are located.

In some embodiments of the present application, the light shielding matrix element is rectangular, surrounds the pixel electrode, and further comprises two light shielding members shielding the two scan lines respectively, and each of the light shielding members is connected between the two light shielding strips.

In another aspect, the embodiment of the present application a display panel comprising a lower substrate, an upper substrate, and a liquid crystal layer located between the lower substrate and the upper substrate, wherein the lower substrate comprises a glass substrate, and a first metal layer, a second metal layer, a light shielding matrix layer, and a transparent conductive layer sequentially stacked on the glass substrate directly or indirectly, and the lower substrate further comprises:

two scan lines formed by patterning the first metal layer;

two data lines formed by patterning the second metal layer, perpendicularly intersecting the scan lines, wherein an aperture region is formed between the two scan lines and the two data lines;

a light shielding matrix element formed by patterning the light shielding matrix layer, disposed above the two data lines, and comprising two light shielding strips parallel to the two data lines; and a pixel electrode formed by patterning the transparent conductive layer, disposed to correspond to the aperture region, located above the light shielding matrix layer, and comprising:

a main pixel electrode portion, wherein the main pixel electrode portion comprises two side edges near the two data lines respectively; and a sub-pixel electrode portion comprises two side edges near the two data lines respectively and two connection lines extending from the two side edges respectively;

wherein each of the light shielding strips shields a corresponding one of the data lines and a corresponding one of the connection lines, and the light shielding strips overlap the two side edges of the main pixel electrode portion respectively and overlap the two side edges of the sub-pixel electrode portion respectively.

In some embodiments of the present application, the two connection lines of the sub-pixel electrode portion extending toward the main pixel electrode portion, and each of the connection line at least partially overlap a corresponding one of the data lines;

a gap is formed between each of the side edges of the main pixel electrode portion and a corresponding one of the connection lines; and each of the light shielding strips comprises:

a first light shielding section shielding a section of one of the data lines near the main pixel electrode portion and one of the connection lines, and overlapping one of the side edges of the main pixel electrode portion; and a second light shielding section connected to the first light shielding section, shielding a section of one of the data lines near the sub-pixel electrode portion, and overlapping one of the side edges of the sub-pixel electrode portion.

In some embodiments of the present application, a size of the main pixel electrode portion along a direction of the scan lines is less than a size of the sub-pixel electrode portion along the direction of the scan lines;

a width of the first light shielding section along the direction of the scan lines is greater than a width of the second light shielding section along the direction of the scan lines.

In some embodiments of the present application, the width of the second light shielding section along the direction of the scan lines is greater than a width of the data line; and the width of the first light shielding section along the direction of the scan lines is greater than a sum of a width of the connection line along the direction of the scan lines and the gap.

Advantages

The present application comprises at least advantages as follows:

The pixel unit of the display panel and the display panel provided by the present application comprise a light shielding matrix element covering data lines. Two light shielding strips of the light shielding matrix element shield the two data lines respectively, each of the light shielding strips comprises a first light shielding section and a second light shielding section. The first light shielding sections overlap side edges of the main pixel electrode portion and overlap connection lines of the sub-pixel electrode portion. The second light shielding sections overlap side edges of the sub-pixel electrode portion, and a width of the first light shielding section is greater than a width of the second light shielding section. The present application uses the technical solution of the above light shielding strips to effectively shield light leakage region between the data lines and the pixel electrode to prevent light of the display panel from leaking out through an unexpected direction and causing light leakage in a dark state, which solves the technical issue of the conventional pixel unit of a display panel forming light leakage regions between data lines and the pixel electrode, causing light leakage in a dark state, and resulting lowered display quality of the display panel and improves display quality.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
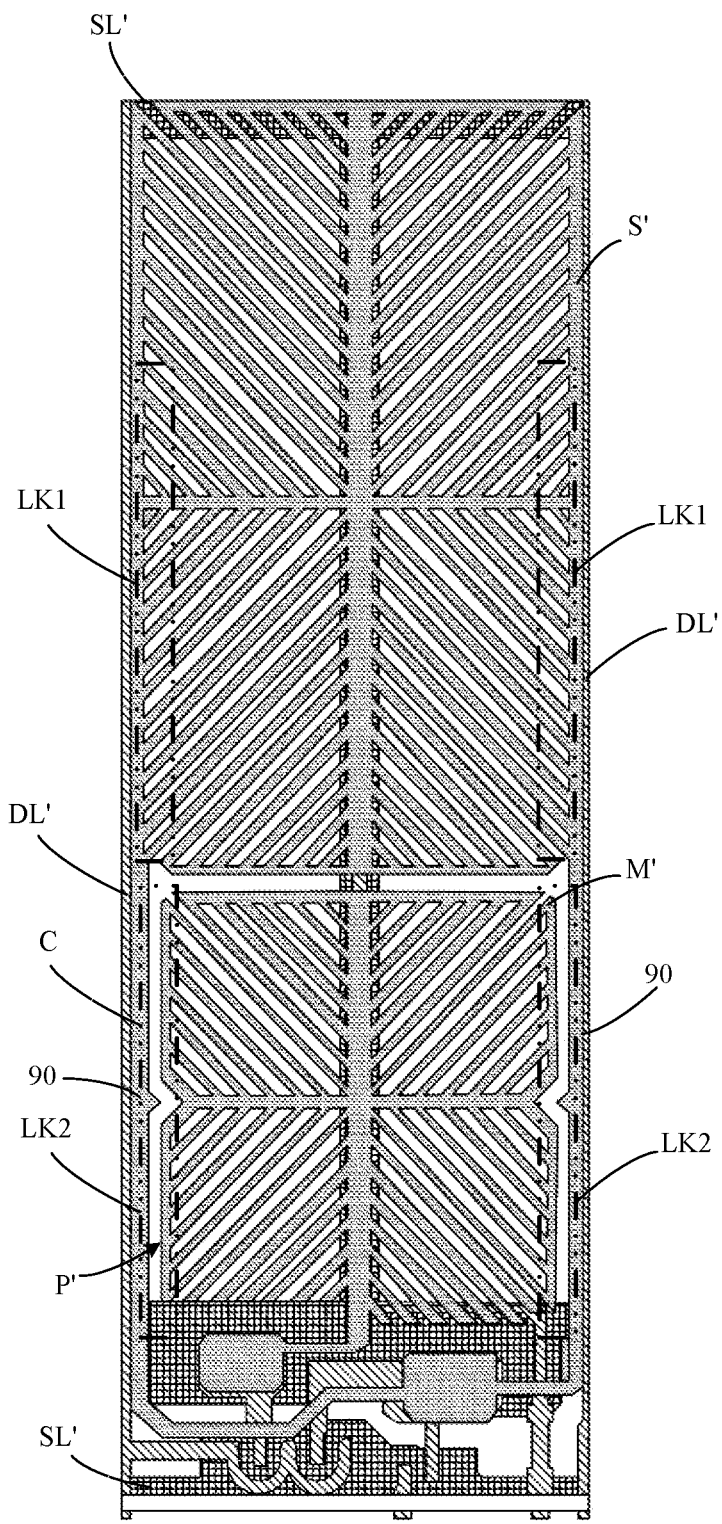
FIG. 1 is a conventional pixel unit of a display panel 的 schematic plane view.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In addition, it should be understood that the specific embodiments described here are only used to illustrate and explain the present application, and are not used to limit the present application. In the present application, the used orientation terminologies such as "upper" and "lower", when are not specified to the contrary explanation, usually refer to the upper and lower states of the device in actual use or working conditions, specifically according to the direction of the figures in the drawings. Furthermore, "inner" and "outer" refer to the outline of the device.

The embodiment of the present application provides a pixel unit of a display panel and a display panel to solve a technical issue of a conventional pixel unit of a display panel forming light leakage regions between data lines and pixel electrode to cause light leakage in a dark state and result in lowered display quality of the display panel.

Figure 2:
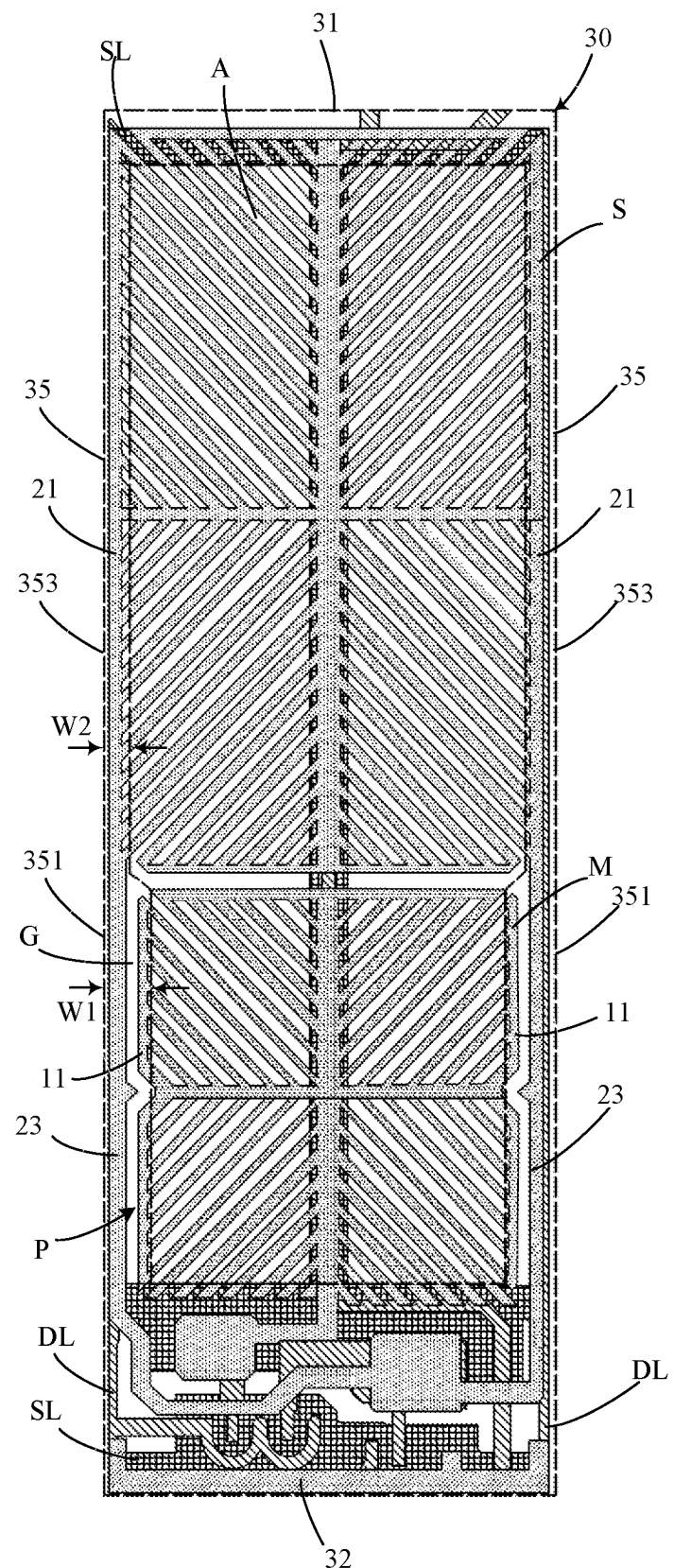
FIG. 2 is a schematic plane view of a pixel unit of a display panel provided by the embodiment of the present application, wherein light shielding matrix element is depicted with broken lines to clearly shows relative relations between elements.
Figure 3:
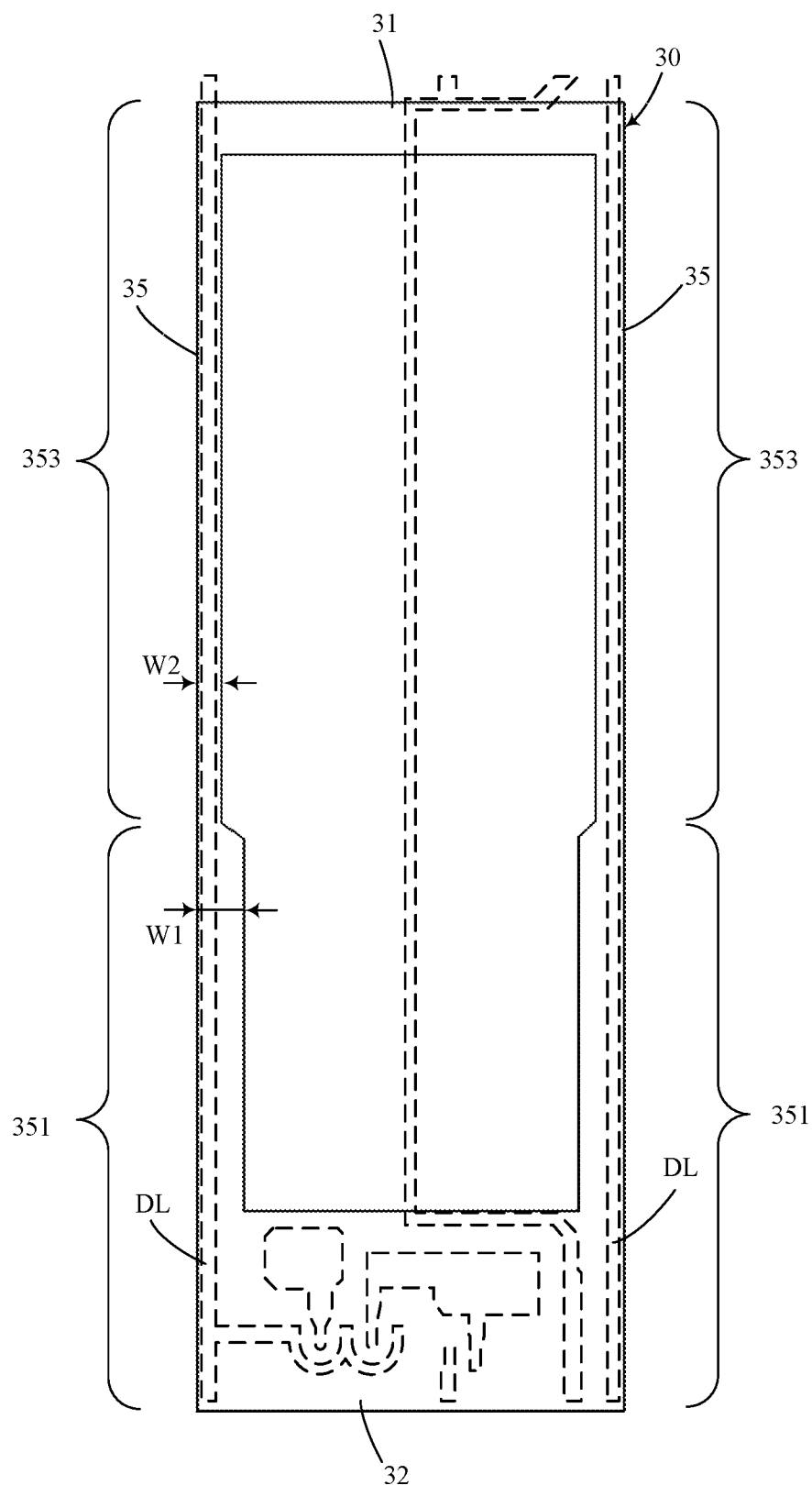
FIG. 3 is a schematic plane view of data lines and light shielding matrix element of the pixel unit of the display panel provided by the embodiment of the present application.

With reference to FIGS. 2 and 3, a pixel unit of a display panel provided by the embodiment of the present application is disposed to correspond to an aperture region formed by two scan lines SL perpendicularly intersecting two data lines DL. The pixel unit comprises: a light shielding matrix element 30, and a pixel electrode P.

The light shielding matrix element 30 is disposed above the two data lines DL and comprises two light shielding strips 35 parallel to the two data lines DL.

The pixel electrode P comprises: a main pixel electrode portion M and a sub-pixel electrode portion S.

The main pixel electrode portion M comprises two side edges 11 near the two data lines DL respectively.

The sub-pixel electrode portion S comprises two side edges 21 near the two data lines DL respectively and two connection lines 23 extending out from the two side edges 21 respectively.

Each of the light shielding strips 35 shields a corresponding one of the data lines DL and a corresponding one of the connection lines 23, the light shielding strips 35 overlap the two side edges 11 of the main pixel electrode portion M respectively, and overlap the two side edges 21 of the sub-pixel electrode portion S respectively.

Considering a reserved width of an alignment tolerance between an upper substrate and a lower substrate in the display panel, a width of the light shielding strip 35 is required to be sufficiently wide enough to allow the light shielding strips 35 to overlap the two side edges 11 of the main pixel electrode portion M and overlap the two side edges 21 of the sub-pixel electrode portion S respectively. Accordingly, when the upper substrate fail to completely align with the lower substrate due to insufficient precision, the sufficiently wide light shielding strips 35 can still be disposed adjacent to the two side edges 11 of the main pixel electrode portion M and the two side edges 21 of the sub-pixel electrode portion S to achieve an excellent light shielding effect for a light leakage region.

In some embodiments of the present application, the two connection lines 23 of the sub-pixel electrode portion S extend toward the main pixel electrode portion respectively, and the connection lines 23 at least partially overlap the data lines DL. A gap G is formed between each of the side edges 11 of the main pixel electrode portion M and a corresponding one of the connection lines 23. Each of the light shielding strips 35 comprises a first light shielding section 351 and a second light shielding section 353.

The first light shielding section 351 shields a section of one of the data lines DL adjacent to the main pixel electrode portion M and one of the connection lines 23, and overlap one of the side edges 11 of the main pixel electrode portion M.

The second light shielding section 353 is connected to the first light shielding section 351, shields a section of one of the data lines DL adjacent to the sub-pixel electrode portion S, and overlaps one of the side edges 21 of the sub-pixel electrode portion S.

In some embodiments of the present application, a size of the main pixel electrode portion M along a direction of the scan lines SL is less than a size of the sub-pixel electrode portion S along the direction of the scan lines SL. A width W1 of the first light shielding section 351 along the direction of the scan lines SL is greater than a width W2 of the second light shielding section 353 along the direction of the scan lines SL.

In some embodiments of the present application, the width W2 of the second light shielding section 353 along the direction of the scan lines SL is greater than a width of the data lines DL. The width W1 of the first light shielding section 351 along the direction of the scan lines SL is greater than a sum of a width of the connection lines 23 along the direction of the scan lines SL and the gap G.

In some embodiments of the present application, a projection of the gap G on a plane where the data lines DL is located is within a projection of the first light shielding section 351 on a plane where the data lines DL is located.

In some embodiments of the present application, the light shielding matrix element 30 is rectangular, surrounds the pixel electrode P, and further comprises two light shielding members 31, 32 shielding the two scan lines SL respectively, and each of the light shielding members 31, 32 is connected between the two light shielding strips 35.

Figure 4:
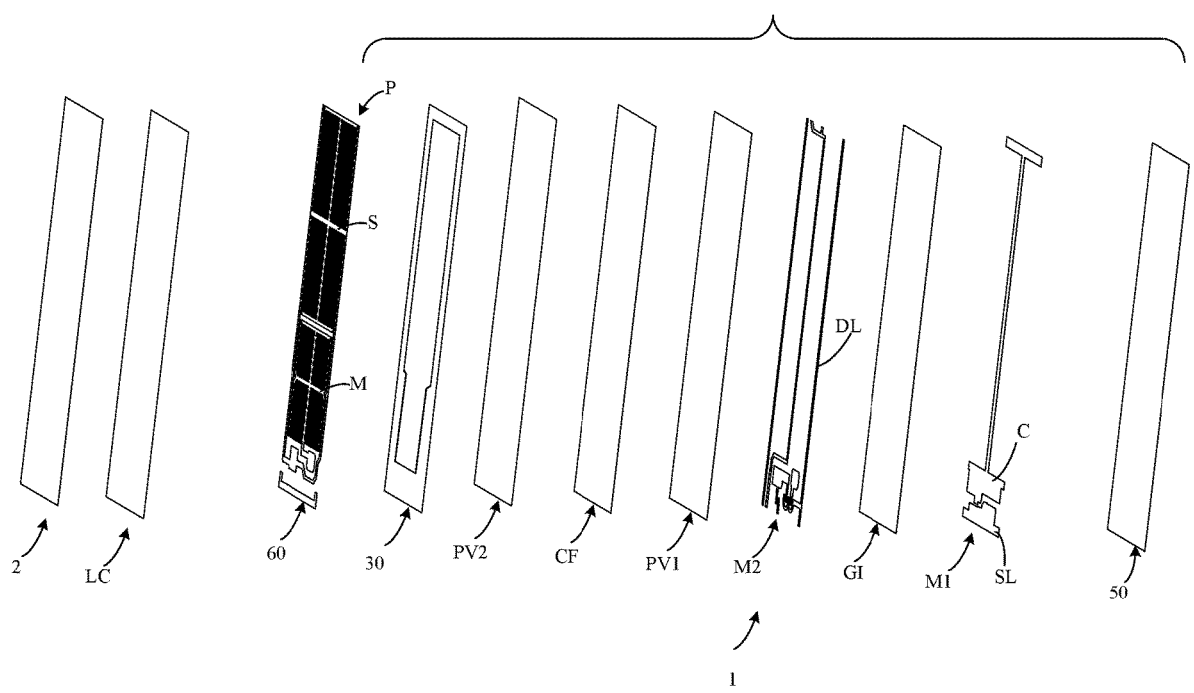
FIG. 4 is a schematic exploded perspective view of the display panel provided by the embodiment of the present application.

With reference to FIG. 4, in another aspect, the embodiment of the present application a display panel comprising a lower substrate 1, an upper substrate 2, and a liquid crystal layer LC located between the lower substrate 1 and the upper substrate 2. The lower substrate comprises a glass substrate 50, and a first metal layer M1, a second metal layer M2, a light shielding matrix layer BM, and a transparent conductive layer 60 sequentially directly or indirectly stacked on the glass substrate 50. The lower substrate 1 further comprises: two scan lines SL, two data lines DL, light shielding matrix element 30, and pixel electrode P.

The two scan lines SL is formed by patterning the first metal layer M1.

The two data lines DL is formed by patterning the second metal layer M2, perpendicularly intersects the scan lines SL. an aperture region is formed between the two scan lines SL and the two data lines DL.

The light shielding matrix element 30 is formed by patterning the light shielding matrix layer BM, is disposed above the two data lines DL, and comprises two light shielding strips 35 parallel to the two data lines DL. In particular, a material of the light shielding matrix layer BM comprises a black photoresist or metal. The light shielding matrix layer BM of a metal material not only comprises a light shielding effect, but also comprises an electrical shielding function.

The pixel electrode P is formed by patterning the transparent conductive layer 60, is disposed to correspond to the aperture region, is located above the light shielding matrix layer BM, and comprises a main pixel electrode portion M and a sub-pixel electrode portion S. A material of the transparent conductive layer 60 can be indium tin oxide (ITO).

The main pixel electrode portion M comprises two side edges 11 near the two data lines DL respectively.

The sub-pixel electrode portion S comprises two side edges 21 near the two data lines DL respectively and two connection lines 23 extending out from the two side edges 21 respectively.

The two light shielding strips 35 shield the two data lines DL respectively, overlap the two side edges 11 of the main pixel electrode portion M, and overlap the two side edges 21 of the sub-pixel electrode portion S.

Considering a reserved width of an alignment tolerance between an upper substrate and a lower substrate in the display panel, a width of the light shielding strip 35 is required to be sufficiently wide enough to allow the light shielding strips 35 to overlap the two side edges 11 of the main pixel electrode portion M and overlap the two side edges 21 of the sub-pixel electrode portion S respectively. Accordingly, when the upper substrate fail to completely align with the lower substrate due to insufficient precision, the sufficiently wide light shielding strips 35 can still be disposed adjacent to the two side edges 11 of the main pixel electrode portion M and the two side edges 21 of the sub-pixel electrode portion S to achieve an excellent light shielding effect for a light leakage region.

In some embodiments of the present application, the two connection lines 23 of the sub-pixel electrode portion S extend toward the main pixel electrode portion respectively, and the connection lines 23 at least partially overlap the data lines DL. A gap G is formed between each of the side edges 11 of the main pixel electrode portion M and a corresponding one of the connection lines 23. Each of the light shielding strips 35 comprises a first light shielding section 351 and a second light shielding section 353.

The first light shielding section 351 shields a section of one of the data lines DL adjacent to the main pixel electrode portion M and one of the connection lines 23, and overlap one of the side edges 11 of the main pixel electrode portion M.

The second light shielding section 353 is connected to the first light shielding section 351, shields a section of one of the data lines DL adjacent to the sub-pixel electrode portion S, and overlaps one of the side edges 21 of the sub-pixel electrode portion S.

In some embodiments of the present application, a size of the main pixel electrode portion M along a direction of the scan lines SL is less than a size of the sub-pixel electrode portion S along the direction of the scan lines SL. A width W1 of the first light shielding section 351 along the direction of the scan lines SL is greater than a width W2 of the second light shielding section 353 along the direction of the scan lines SL.

In some embodiments of the present application, the width W2 of the second light shielding section 353 along the direction of the scan line SL is greater than a width of the data lines DL. The width W1 of the first light shielding section 351 along the direction of the scan lines SL is greater than a sum of a width of the connection line 23 along the direction of the scan lines SL and the gap G.

In particular, the lower substrate 1 of the display panel provided by the embodiment of the present application further comprises: an insulation layer GI, semiconductor layer (not shown), a first passivation layer PV1, a color photoresist layer CF, and a second passivation layer PV2. The glass substrate 50, the first metal layer M1, the insulation layer GI, the semiconductor layer, the second metal layer M2, the first passivation layer PV1, the color photoresist layer CF, the second passivation layer PV2, the light shielding matrix layer BM, and the transparent conductive layer 60 are sequentially stacked to form the lower substrate 1.

The present application comprises at least advantages as follows:

The pixel unit of the display panel and the display panel provided by the present application comprise a light shielding matrix element covering data lines. Two light shielding strips 35 of the light shielding matrix element shields the two data lines respectively, each of the light shielding strips 35 comprises a first light shielding section 351 and a second light shielding section 353. The first light shielding sections overlap side edges 11 of the main pixel electrode portion M and overlap connection lines 21 of the sub-pixel electrode portion S. The second light shielding sections 353 overlap side edges 21 of the sub-pixel electrode portion S, and a width of the first light shielding section 351 is greater than a width of the second light shielding section 353. The present application uses the technical solution of the above light shielding strips 35 to effectively shield light leakage region between the data lines DL and the pixel electrode P to prevent light of the display panel from leaking out through an unexpected direction and causing light leakage in a dark state, which solves the technical issue of the conventional pixel unit of a display panel forming light leakage regions between data lines DL and the pixel electrode P, causing light leakage in a dark state, and resulting lowered display quality of the display panel and improves display quality.

The pixel unit of the display panel and the display panel provided by the embodiment of the present application are described in detail. In the specification, the specific examples are used to explain the principle and embodiment of the present application. The above description of the embodiments is only used to help understand the method of the present application and its spiritual idea. Meanwhile, for those skilled in the art, according to the present the idea of invention, changes will be made in specific embodiment and application. In summary, the contents of this specification should not be construed as limiting the present application.

What is claimed is:

1. A pixel unit of a display panel, disposed to correspond to an aperture region formed by two scan lines perpendicularly intersecting two data lines, and the pixel unit comprising:

a light shielding matrix element disposed above the two data lines and comprising two light shielding strips parallel to the two data lines; and a pixel electrode comprising:

a main pixel electrode portion, wherein the main pixel electrode portion comprises two side edges near the two data lines respectively; and a sub-pixel electrode portion comprises two side edges near the two data lines respectively and two connection lines extending from the two side edges respectively;

wherein each of the light shielding strips shields a corresponding one of the data lines and a corresponding one of the connection lines, and the light shielding strips overlap the two side edges of the main pixel electrode portion respectively and overlap the two side edges of the sub-pixel electrode portion respectively;

wherein the two connection lines of the sub-pixel electrode portion extending toward the main pixel electrode portion, and each of the connection line at least partially overlap a corresponding one of the data lines;

wherein a gap is formed between each of the side edges of the main pixel electrode portion and a corresponding one of the connection lines; and wherein each of the light shielding strips comprises:
- a first light shielding section shielding a section of one of the data lines near the main pixel electrode portion and one of the connection lines, and overlapping one of the side edges of the main pixel electrode portion; and
- a second light shielding section connected to the first light shielding section, shielding a section of one of the data lines near the sub-pixel electrode portion, and overlapping one of the side edges of the sub-pixel electrode portion.

2. The pixel unit of a display panel according to claim 1, wherein
- a size of the main pixel electrode portion along a direction of the scan lines is less than a size of the sub-pixel electrode portion along the direction of the scan lines;
- a width of the first light shielding section along the direction of the scan lines is greater than a width of the second light shielding section along the direction of the scan lines.

3. The pixel unit of a display panel according to claim 2, wherein
- the width of the second light shielding section along the direction of the scan lines is greater than a width of the data line; and
- the width of the first light shielding section along the direction of the scan lines is greater than a sum of a width of the connection line along the direction of the scan lines and the gap.

4. The pixel unit of a display panel according to claim 1, wherein a projection of the gap on a plane where the data lines are located is within a projection of the first light shielding section on the plane where the data lines are located.

5. The pixel unit of a display panel according to claim 1, wherein the light shielding matrix element is rectangular, surrounds the pixel electrode, and further comprises two light shielding members shielding the two scan lines respectively, and each of the light shielding members is connected between the two light shielding strips.

6. A display panel, comprising a lower substrate, an upper substrate, and a liquid crystal layer located between the lower substrate and the upper substrate, wherein the lower substrate comprises a glass substrate, and a first metal layer, a second metal layer, a light shielding matrix layer, and a transparent conductive layer sequentially stacked on the glass substrate directly or indirectly, and the lower substrate further comprises:
- two scan lines formed by patterning the first metal layer;
- two data lines formed by patterning the second metal layer, perpendicularly intersecting the scan lines, wherein an aperture region is formed between the two scan lines and the two data lines;
- a light shielding matrix element formed by patterning the light shielding matrix layer, disposed above the two data lines, and comprising two light shielding strips parallel to the two data lines; and
- a pixel electrode formed by patterning the transparent conductive layer, disposed to correspond to the aperture region, located above the light shielding matrix layer, and comprising:
- a main pixel electrode portion, wherein the main pixel electrode portion comprises two side edges near the two data lines respectively; and
- a sub-pixel electrode portion comprises two side edges near the two data lines respectively and two connection lines extending from the two side edges respectively;

wherein each of the light shielding strips shields a corresponding one of the data lines and a corresponding one of the connection lines, and the light shielding strips overlap the two side edges of the main pixel electrode portion respectively and overlap the two side edges of the sub-pixel electrode portion respectively.

7. The display panel according to claim 6, wherein
the two connection lines of the sub-pixel electrode portion extending toward the main pixel electrode portion, and each of the connection line at least partially overlap a corresponding one of the data lines;
a gap is formed between each of the side edges of the main pixel electrode portion and a corresponding one of the connection lines; and
each of the light shielding strips comprises:
a first light shielding section shielding a section of one of the data lines near the main pixel electrode portion and one of the connection lines, and overlapping one of the side edges of the main pixel electrode portion; and
a second light shielding section connected to the first light shielding section, shielding a section of one of the data lines near the sub-pixel electrode portion, and overlapping one of the side edges of the sub-pixel electrode portion.

8. The display panel according to claim 7, wherein
a size of the main pixel electrode portion along a direction of the scan lines is less than a size of the sub-pixel electrode portion along the direction of the scan lines;
a width of the first light shielding section along the direction of the scan lines is greater than a width of the second light shielding section along the direction of the scan lines.

9. The display panel according to claim 8, wherein
the width of the second light shielding section along the direction of the scan lines is greater than a width of the data line; and
the width of the first light shielding section along the direction of the scan lines is greater than a sum of a width of the connection line along the direction of the scan lines and the gap.

* * * * *